(12) United States Patent
Goel et al.

(10) Patent No.: US 9,652,242 B2
(45) Date of Patent: May 16, 2017

(54) APPARATUS FOR PREDICATE CALCULATION IN PROCESSOR INSTRUCTION SET

(75) Inventors: Rajat Goel, Saratoga, CA (US); Sandeep Gupta, Santa Clara, CA (US); Yamini Modukuru, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 13/461,950

(22) Filed: May 2, 2012

(65) Prior Publication Data
US 2013/0297918 A1 Nov. 7, 2013

(51) Int. Cl.
*G06F 9/38* (2006.01)

(52) U.S. Cl.
CPC .................................. *G06F 9/38* (2013.01)

(58) Field of Classification Search
CPC ................... G06F 9/30058; G06F 9/30094
USPC .......................................... 712/234, 226, 235
See application file for complete search history.

(56) References Cited

U.S. PATENT DOCUMENTS

| | | | |
|---|---|---|---|
| 5,193,157 A * | 3/1993 | Barbour et al. | 712/234 |
| 5,349,671 A | 9/1994 | Maeda et al. | |
| 5,408,620 A * | 4/1995 | Asakawa et al. | 712/234 |
| 5,504,867 A * | 4/1996 | Bosshart | G06F 7/507 |
| | | | 712/234 |
| 5,958,046 A | 9/1999 | Bondi et al. | |
| 6,009,512 A * | 12/1999 | Christie | 712/226 |
| 6,516,407 B1 * | 2/2003 | Suga | G06F 9/30072 |
| | | | 712/226 |
| 7,146,487 B2 | 12/2006 | Drabenstott et al. | |
| 2004/0044884 A1 * | 3/2004 | Devereux | 712/226 |
| 2004/0158696 A1 | 8/2004 | Col | |
| 2006/0215709 A1 | 9/2006 | Kuwata | |
| 2008/0077771 A1 | 3/2008 | Guttag et al. | |
| 2009/0113174 A1 | 4/2009 | Wolf et al. | |

FOREIGN PATENT DOCUMENTS

| | | |
|---|---|---|
| EP | 0055392 | 7/1982 |
| TW | 200937283 | 1/2008 |
| WO | 00/45282 | 8/2000 |

OTHER PUBLICATIONS

Extended European Search Report in Application No. 13165988.0, dated Nov. 25, 2013, pp. 1-5.

(Continued)

*Primary Examiner* — Andrew Caldwell
*Assistant Examiner* — Michael Metzger
(74) *Attorney, Agent, or Firm* — Meyertons, Hood, Kivlin, Kowert & Goetzel, P.C.; Erik A. Heter

(57) ABSTRACT

An apparatus and method for calculating flag bits is disclosed. The flag bits may be used in a processor utilizing branch predication. More particularly, the apparatus and method may be used to calculate a predicate that can be used by a branch unit to evaluate whether a branch is to be taken. In one embodiment, the apparatus is coupled to receive a condition code associated with an instruction, and flag bits generated responsive to execution of the instruction. The condition code is indicative of a condition to be checked resulting from execution of the instruction. The apparatus may then provide an indication of whether the condition is true.

23 Claims, 5 Drawing Sheets

(56) References Cited

OTHER PUBLICATIONS

Microprocessing and Microprogramming 36, "ALU Design and Processor Branch Architecture", G.B. Steven and F.L. Steven, Jun. 17, 1993, pp. 259-278.
International Search Report from PCT/US13/38425, dated Sep. 20, 2013, Apple Inc, pp. 1-3.
International Preliminary Report on Patentability from PCT/US2013/038425, mailed Nov. 13, 2014, Apple Inc., pp. 1-7.
Office Action from Taiwanese Application No. 102115530, issued Oct. 7, 2014, English and Chinese versions, pp. 1-7.
Office action in European Patent Application 13165988.0 issued Sep. 14, 2015.
Office action in Chinese Patent Application No. 201380022955.0 issued Jul. 11, 2016.
Office action in Korean Patent Application No. 10-2014-7032976 issued Mar. 22, 2016.
Office action in Chinese Patent Application No. 201380022955.0 issued Jan. 17, 2017.

\* cited by examiner

```
         Branch [CC]                    Branch [CC]  ┐
            I1                              I1       │
                          │                          │
            I2            │       or       I2        │
                          │                          │
            I3            │                I3        │
                          ▼                          │
            I4                              I4   ◄───┘

CC's for Mux 31A:                              CC's for Mux 31B:

0000   Equal, Z == 1                     0100   Negative, N == 1

0001   Not Equal, Z == 0                 0101   Positive, N == 0

0010   Carry Set, C == 1                 0110   Overflow, V == 1

0011   Carry Clear, C == 0               0111   No Overflow, V == 0

1000   Unsigned Higher, C == 1 And Z == 0    1010   Signed Greater Than/Equal, N == V 1001   Unsigned Lower or Same, C == 0 Or Z == 1   1011   Signed Less Than, N != V 1110   Always                            1101   Signed Less Than/Equal N != V 1111   Always CC for Logic Unit
1100   Greater Than, Z == 0 AND N != V
                                         A3 = Z And C        A7 = N and V
                                         A2 = Z And C_       A6 = N and V_
                                         A1 = Z_ And C       A5 = N_ and V
              Fig. 4                     A0 = Z_ and C_      A4 = N_ and V_

APPARATUS FOR PREDICATE CALCULATION IN PROCESSOR INSTRUCTION SET

BACKGROUND

Technical Field

This disclosure is directed to processors, and more particularly, to method and apparatus embodiments for handling predicate calculation for branch instructions.

Description of the Related Art

Many modern processors utilize execution techniques such as branch prediction and branch predication to increase performance. Branch prediction is a technique in which the result of an instruction having a conditional branch is predicted in advance. Instructions following the branch instruction in the predicted path may be speculatively executed. If the prediction is correct, the results of the speculatively executed instructions are available to commit to registers as soon as they are needed. Otherwise, the results obtained from speculative execution of the instructions in the predicted path are discarded, while the instructions in the correct path may be executed.

As an alternative to branch prediction, branch predication is a technique in which instructions for both possible paths of a conditional branch are speculatively executed. The correct path may be subsequently determined by execution of the instruction having the conditional branch. Once the correct path is determined, the results from the corresponding instructions may be committed to registers, while the results from instructions in the incorrect path may be discarded.

For some instructions, flag bits may be set during their execution. Condition codes may also be associated with certain instructions. For those instructions having conditional branches, the condition codes indicate which flags are to be checked to determine whether a branch is taken. In some instruction set architectures, instructions that set flags and check the flags according to condition codes may be combined. Thus, the setting of a flag and the determination of a particular condition may occur in a single cycle. Such combined instructions may be used for branch predication.

SUMMARY

An apparatus and method for calculating flag bits is disclosed. The flag bits may be used in a processor utilizing branch predication. More particularly, the apparatus and method may be used to calculate a predicate that can be used by a branch unit to evaluate whether a branch is to be taken. In one embodiment, the apparatus is coupled to receive a condition code associated with an instruction, and flag bits generated responsive to execution of the instruction. The condition code is indicative of a condition to be checked resulting from execution of the instruction. The apparatus may then provide an indication of whether the condition is true.

In one embodiment, an apparatus for predicate calculation includes a number of multiplexers. Each of the multiplexers includes data inputs coupled to receive a corresponding modified condition code. The multiplexers further include select inputs coupled to receive flag bits generated during execution of an instruction associated with an unmodified condition code (upon which the modified condition codes are based). Output logic circuitry coupled to receive outputs from the multiplexers may provide an output indicative of whether a condition indicated by the condition code is true.

The apparatus for predicate calculation may also include one or more additional logic circuits arranged to calculate a condition that is otherwise not determined using the multiplexers. The one or more additional logic circuits may have a final output that is also coupled to the output logic circuitry.

A branch unit may be coupled to receive the final output from the apparatus for predicate calculation. Based on whether the condition is true, the branch unit may determine whether a branch is to be taken in a sequence of instructions. Furthermore, the apparatus for predicate calculation may be used with speculatively executed instructions. For example, a sequence of instruction may include two possible paths depending on the results of a particular condition associated with a branch instruction. The instructions of the two possible paths may both be speculatively executed with the corresponding results retained in a register file. The branch instruction may be an instruction that includes two operations, the first of which determines the state of one or more flag bits and a second of which determines whether a condition is true (as defined by the condition code) based on the state of the one or more flag bits. Execution of the branch instruction may thus determine which path is taken. Once the correct path is determined, the results from the other path may be discarded, while results from the correct path may be retained to be committed to architected registers.

BRIEF DESCRIPTION OF THE DRAWINGS

The following detailed description makes reference to the accompanying drawings, which are now briefly described.

FIG. 3 is a logic diagram of one embodiment of a predicate calculation unit.

FIG. 4 is an illustration of various condition codes and the calculation of corresponding modified condition codes.

Figure 1:
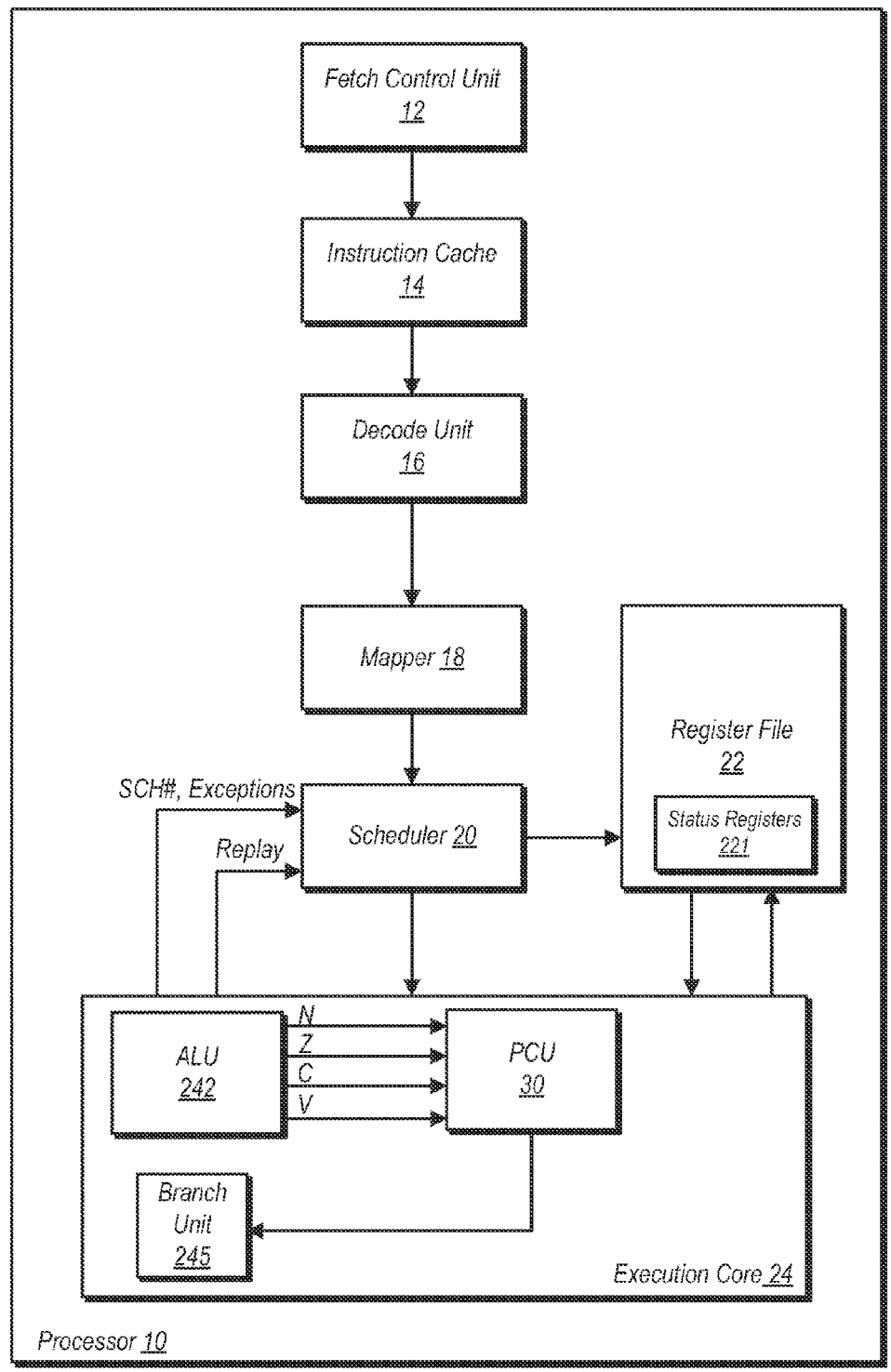
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a processor 10 is shown. Processor 10 may be one of one or more processors implemented on an integrated circuit. In the illustrated embodiment, the processor 10 includes a fetch control unit 12, an instruction cache 14, a decode unit 16, a mapper 18, a scheduler 20, a register file 22, and an execution core 24. In the illustrated embodiment, the execution core 24 includes an arithmetic logic unit (ALU) 242, a predicate calculation unit (PCU) 30, and a branch unit 245. The fetch control unit 12 is coupled to provide a program counter (PC) for fetching from the instruction cache 14. The instruction cache 14 is coupled to provide instructions to the decode unit 16, which is coupled to provide microops to the mapper 18. The mapper 18 is coupled to provide microops, a scheduler number (SCH#) and source operand numbers (SO#s) to the scheduler 20. The scheduler 20 is coupled to receive a replay signal and a SCH# and exception indications from execution core 24, and is also coupled to the register file 22. Register file 22 is coupled to provide operands to execution core, and is coupled to receive results to be written to the register file 22 therefrom. In addition, register file 22 may also include one or more status registers 221 that store various information regarding particular instructions. Included in this information may be condition codes as well as one or more bits that, when set, indicate when a condition associated with a particular condition code is to be checked responsive to execution of a corresponding instruction. Such conditions may be checked for, among other reasons, determining whether a conditional branch in an instruction sequence is taken or not taken.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations. Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the mapper 18. The mapper 18 may implement register renaming to map source register addresses from the microops to the source operand numbers (SO#s) identifying the renamed source registers. Additionally, the mapper 18 may assign a scheduler entry to store each microop, identified by the SCH#. In one embodiment, the SCH# may also identify the rename register assigned to the destination of the microop. In other embodiments, the mapper 18 may assign a separate destination register number.

The mapper 18 may provide the microops, along with SCH#, SO#s, and LSQ# (if applicable) for each microop to scheduler 20. The scheduler 20 may store the microops in the scheduler entries identified by the respective SCH#s, along with the SO#s and LSQ#. The scheduler 20 may schedule the microops for execution in the execution core 24. When a microop is scheduled, the scheduler 20 may read its source operands from the register file 22 and the source operands may be provided to the execution core 24. For load/store operations, the source operands include address operands used to generate the address of the memory location accessed by the load/store operation. Address operands of a load/store operation may include register operands provided from the register file 22 as well as displacement operands encoded in the load/store microop itself.

In the embodiment shown, ALU 242 may comprise one or more execution units configured to execute instructions. In one embodiment, ALU 242 may include a fixed point unit for executing instructions with fixed point operands, a floating point unit for executing instructions with floating point operands, and an integer unit fore executing instructions with integer operands. ALU 242 may also include other types of circuitry as well, such as a load/store unit, one or more shifters, and so on.

In the embodiment shown, processor 10 may support speculative execution of instructions. In addition to the architected registers, register file 22 may include additional copies of each of the registers. Mapper 18 may indicate at any given time which of the registers of register file 22 are logical registers and which are physical registers, and this mapping may change frequently during operation. The logical registers may be defined as those registers storing non-speculative states for the architected registers. The physical registers may be defined as those not currently storing non-speculative states for architected registers. Physical registers may thus include those storing speculative states resulting from speculatively executed instructions. As an instruction sequence executes, some of the physical registers may be renamed to become logical registers as their respectively stored states become non-speculative.

Some instruction sequences executed on processor 10 may include conditional branch instructions. Responsive to the execution of a conditional branch instruction, a resulting condition may determine which of two paths may be taken. In some cases, the instructions in the one or both paths following a branch instruction may be speculatively executed, with their corresponding results stored in physical registers. Processor 10 in the embodiment shown is configured to perform branch predication for some branches. Using branch predication, instructions in both paths following a conditional branch instruction are speculatively executed prior to the branch instruction. The results of these instructions may be stored in physical registers. Responsive to execution of the branch instruction, the results of the correct path (i.e. the path taken by the branch) may remain stored in physical registers, which may be subsequently renamed as logical registers. Results of instructions associated with the path not taken may be discarded.

In the embodiment shown, some conditional branch instructions may be referred to as predicated branch instructions. A predicated branch instruction may be a conditional branch instruction associated with a predicated branch (in contrast to a predicted branch). As discussed above, a number of instructions in both possible paths following a predicated branch instruction may be speculatively executed. The predicated branch instruction may include two operations (and may be referred to as a fused branch instruction). Execution of the first operation may cause the states of a number of different flag bits to be set. Execution of the second operation may determine a condition based on the state of the flag bits. The condition may be defined by a condition code, and thus the second operation may effectively be a comparison of the condition code against one or more of the generated flag bits. For example, a condition code may define that results in the taking of a branch if the result of an operation is greater than a given value. Execution of the first operation may set one or more of the flag bits to indicate whether a resulting value is greater than the given value. Execution of the second operation may perform the comparison operation to determine if the condition (e.g., the value being greater than the given value) is true. In the embodiment shown, PCU 30 may enable execution of a predicated branch instruction in one instruction cycle while still meeting timing requirements.

In the embodiment shown, PCU 30 is coupled to receive four flag bits (N, Z, C, and V) from ALU 242. The flags for this embodiment may be defined as follows: N=Negative Result from ALU, Z=Zero Result from ALU, C=Carry Operation from ALU, V=Overflow Operation from ALU. Embodiments using different and/or additional flags are possible and contemplated.

PCU 30 is also coupled to receive condition codes from status registers 221 of register file 22. As noted above, the condition codes may indicate a condition that is to be checked responsive to execution of a predicated branch instruction. In one embodiment, the condition codes may include four bits, and may thus check for the presence of one of up to sixteen different conditions. These condition codes may be compared by PCU 30 to a condition resulting from execution of the first operation of the of the fused branch instruction, as indicated by the flag bits. Responsive to evaluating if the condition is true or not, PCU 30 may generate an indication that is provided to branch unit 245. Depending on the whether the condition is true, branch unit 245 may either indicate whether the branch was taken or not and generate a corresponding indication. Execution core 24 may convey the indication generated by branch unit 245 to register file 22, which may invalidate the physical registers corresponding to the results from the path not taken.

Figure 2:
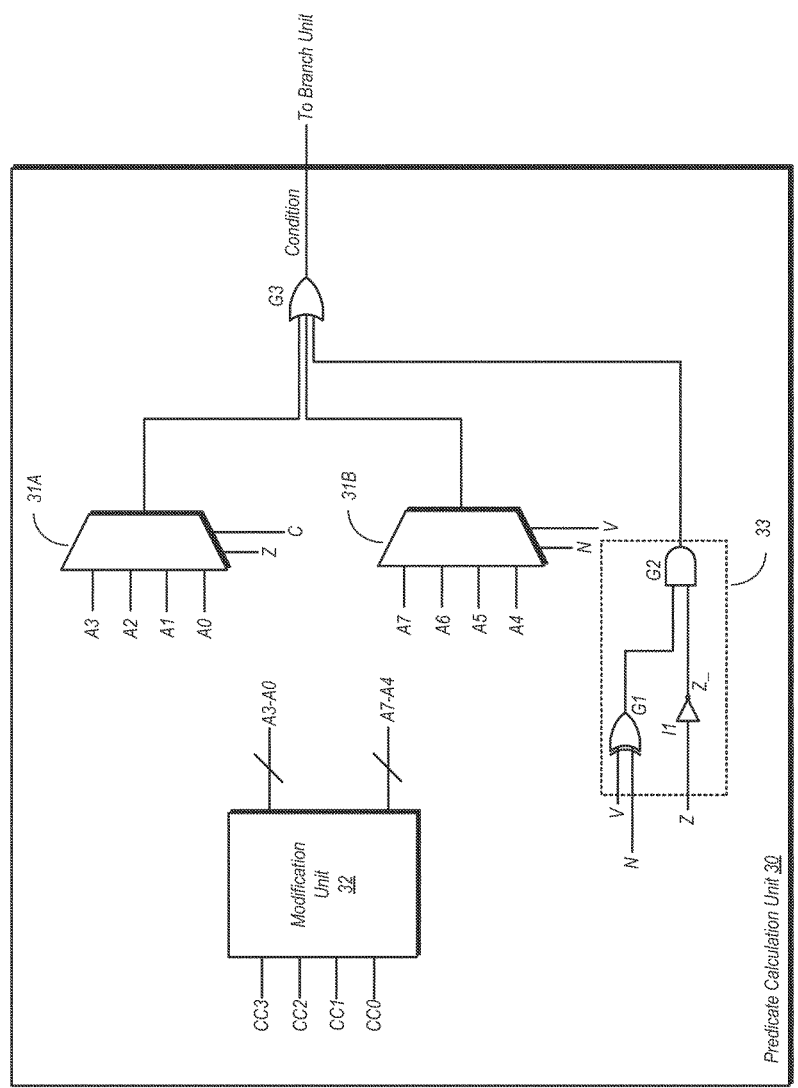
FIG. 2 is a drawing illustrating an exemplary instruction flow for a predicated branch operation.

The operation of one embodiment of PCU 30 will now be explained in conjunction with FIGS. 2-4. FIG. 2 illustrates one embodiment of a PCU 30. In the embodiment shown, PCU 30 includes a pair of multiplexer 31A and 31B, a modification unit 32, a logic unit 33, and an output circuit implemented as OR gate G3. Multiplexers 31A and 31B use generated flag bits as select inputs, while using modified condition codes as data inputs.

Modification unit 32 in the embodiment shown is coupled to receive a four bit unmodified condition code (CC3-CC0) from a status register. Based on the condition code received, modification unit 32 may generate corresponding modified condition codes that are provided to multiplexers 31A and 31B.

As noted above, processor 10 in the embodiment shown in FIG. 1 includes an ALU 242 configured to generate the flag bits N, Z, C, and V. In the embodiment of PCU 30 shown in FIG. 2, the Z and the C bits are provided to the select inputs to multiplexer 31A, while the N and V bits are provided to the select inputs of multiplexer 31B. Additionally, logic unit 33 is coupled to receive the N, V, and Z bits.

The outputs of multiplexers 31A and 31B, along with the output of logic circuit 33, may be combined by OR gate G3 to produce the signal labeled here as 'Condition'. If the condition indicated by the condition code is true, the condition signal may be asserted as a logic 1. Otherwise, if the condition is false, the condition signal may be de-asserted as a logic 0. The condition signal may be provided to branch unit 245, which may or may not cause a branch to be taken depending on the result received from PCU 30.

FIG. 3 is an illustration showing the possible paths for an exemplary branch instruction. In the example shown, a conditional branch instruction associated by a condition code ('Branch[CC]') is shown as being followed by an instruction sequence of I1-I6. Instructions I1-I6 may be speculatively executed if all previous dependencies have been satisfied, with the exception of the result of execution of the conditional branch instruction. In this example, if the branch is taken, the instruction sequence skips instructions I1, I2, and I3, and instead causes a jump directly to instruction I4. If the branch is not taken, I1-I4 are executed in the sequence shown. Processor 10 as shown in FIG. 1 may thus speculatively execute the sequence of instructions as if the branch has been taken and as if the branch was not taken. Results for both of these cases may be written to physical registers in register file 22 and stored therein until the conditional branch instruction has been executed. If execution of the conditional branch instruction determines that the branch was taken, the results from the branched path may be retained and subsequently committed to logical registers, while the results associated with the unbranched path may be discarded. If the branch is not taken, the results from the unbranched path may be retained to be subsequently committed to logical registers, while the results corresponding to the branched path are discarded.

As noted above, the condition indicated by the condition code may be used to determine if a branch is taken or not. As shown in FIG. 4, the conditions may be divided into three different sets, one applicable to multiplexer 31A, one applicable to multiplexer 31B, and a special condition applicable to logic circuit 33A. For multiplexers 31A and 31B, a given unmodified condition code provided to modification unit 32 in this embodiment results in a modified condition code being provided to one of the multiplexers and all logic zeros being provided to the other multiplexer. For example, if the unmodified condition code is one of those listed as being associated with multiplexer 31A, a corresponding modified condition code is provided to multiplexer 31A (inputs A3-A0) while all logic zeros are provided to multiplexer 31B (inputs A7-A4). If the unmodified condition code corresponds to the special condition associated with logic unit 33, then all logic zeros are provided to both multiplexers.

FIG. 4 also includes a number of equations that indicate conditions that are checked based on the setting of the flag bits that results from the execution of a conditional branch instruction. For example, in multiplexer 31A, input A3 is selected if Z and C (Z and C) are both logic 1's, while input A2 is selected if Z is a logic 1 and C is a logic 0 (Z and C_). Thus, if the execution of a conditional branch instruction results in the setting of the Z flag (Z=1), then the state of one of inputs A3 or A2 is provided as the output from multiplexer 31A, depending on the state of the C flag. If the condition to be checked is whether the Z flag is Z=1, without regard for the value of the C, modification unit 32 may then set both A3 and A2 to be logic 1's. Modification unit 32 may also set inputs A1 and A0 to logic 0's if the condition to be checked is Z=1 (since A1=Z_ and C, while A0=Z_ and C_). If execution of the instruction results in Z=1, a logic 1 is thus provided on the Z selection input of multiplexer 31A. Since the condition to be checked in this example is whether Z=1, a logic 1 propagates through to the output of multiplexer 31A (irrespective of the C flag in this particular example) and thus to the condition output via OR gate G3. Accordingly, in this example, the assertion of the condition output as a logic 1 indicates that the condition corresponding to the unmodified condition code is true.

If execution of the instruction in this example results in Z=0, a logic 0 is provided to the Z input of multiplexer 31A. Again, since the condition to be checked in this example is whether Z=1 (irrespective of C), the result of Z=0 thus leads to a logic 0 propagating from either A1 or A0 to the output of multiplexer 31A and thus to the output of PCU 30 through OR gate G3. The logic 0 on the output of OR gate G3 indicates that the condition that was checked, Z=1, was not true.

As another example, consider when the condition corresponds to input condition code 1000, in which C=1 and Z=0. This condition corresponds to A1=1, with A3, A3, and A0 each being a logic 0. Accordingly, if this condition is input into modification unit 32, A1 is set to a logic 1, A3, A3, and A0 are set to logic 0's, and each of the data inputs into multiplexer 31B (A7-A4) are also set to logic 0's. If the execution of the corresponding branch instruction results in the C flag being set as a logic 1 and the Z flag being set as a logic 0, the logic 1 from A1 is propagated through multiplexer 31A to the condition output of PCU 30, indicating that the input condition designated by the condition code is true. If any other combination of Z and C results from execution of the corresponding branch instruction (e.g., Z=1 and/or C=0) then a logic 0 is output forwarded through multiplexer 31A to the condition output, thereby indicating that a check of the input condition designated by the unmodified condition code is false.

A third example of the operation of PCU 30 occurs when the value of N is not equal to the value of V (N!=V). For N!=V, when N=1, V=0, and when N=0, V=1. In looking at the equations in the lower right hand portion of FIG. 4, it can be seen that these two cases correspond to A6=N and V_ and A5=N_ and V. Accordingly, if condition code corresponding to N!=V (1011) is received, modification unit 32 may respond by providing logic 1's to A6 and A5 of multiplexer 31B, while providing logic 0's to A7 and A4. Modification unit 32 may also provide all logic 0's to the data inputs (A3-A0) of multiplexer 31A responsive to receiving the condition code corresponding to N!=V. When the flag bits are provided to the selection inputs, A6 will be selected when N=1 and V=0, while A5 if N=0 and V=1. If either A6 or A5 is selected, the condition of N!=V is true, and thus a logic 1 will propagate through multiplexer 31B to the condition output of PCU 30. If N and V are both logic 1's, or both logic 0's, As a final example, the special condition that utilizes logic unit 33 is now discussed. For multiplexers 31A and 31B, the flag bits are provided as select inputs in two mutually exclusive groups (Z and C to multiplexer 31A, N and V to multiplexer 31B). For logic unit 33, flag bits from each of these groups are provided. More particularly, logic unit 33 in the embodiment shown is coupled to receive the N and V bits from one group, and the Z bit from another group. Logic unit 33 may be used to check for the 'greater than' condition in which Z=0 and N!=V (which corresponds to condition code 1100). Responsive to receiving the condition code 1100, modification unit 32 may provide all logic 0's as data inputs to both of multiplexers 31A and 31B.

Logic unit 33 in the embodiment shown includes and XOR gate G1 coupled to receive the N and V flag bits, and an inverter I1 coupled to receive the Z flag bit. Respective outputs of NOR gate G1 and inverter I1 are coupled to corresponding inputs of AND gate G2. If the N and V flag bits are provided in logically complementary states (e.g., N=1 and V=0), NOR gate G1 outputs a logic 1. Similarly, if Z is provided as a logic 0, inverter I1 outputs Z_ as a logic 1. When both of its inputs are logic 1, AND gate G2 correspondingly outputs a logic 1. Thus, if the flag bits generated responsive to execution of the branch instruction associated with the condition code 1100 result in Z=0 and N!=V, logic unit 33 outputs a logic 1 that propagates to the condition output and indicates that the condition is true. If Z=1, or N and V are logically equivalent (e.g.,both logic 1's), then logic unit 33 outputs a logic 0 and thus the condition is indicated as not being true.

In general, the operation of PCU 30 may be described as follows. As noted above, a fused branch instruction includes two operations, one in which the flags bits are generated, and another in which the condition is checked in light of the flag bits. PCU 30 in the embodiment shown is configured to perform the second operation. Prior to execution of the fused branch instruction, a corresponding condition code may be provided to PCU 30, and more particularly, to modification unit 32. Responsive to receiving the unmodified condition code, modification unit 32 may generate corresponding modified condition codes that are provided as data inputs to multiplexers 31A and 31B. When the first operation of the fused branch instruction is executed, the flag bits may be generated and thus provided as selection inputs to multiplexers 31A and 31B, as well as being provided to the inputs of logic unit 33. Accordingly, execution of the second operation of the fused branch instruction may occur responsive to generation of the flag bits, which in turn cause PCU 30 to provide an indication of whether the condition indicated by the received condition code is true.

The arrangement shown in FIG. 2 may allow for faster predicate calculation for predicated branch instructions relative to prior art embodiments. In one prior art embodiment, a 16-1 multiplexer is coupled to receive condition codes as select inputs, while receiving indications of calculated conditions (resulting from execution of the first operation) as data inputs. In such an embodiment, the calculation of each of the possible conditions resulting from execution of the first operation is performed prior to inputting the condition codes to the select inputs. In such an embodiment, a minimum of seven gate delays is present, which may adversely affect the ability to meet timing objectives. In contrast, in the embodiment of FIG. 2, the data and selection inputs are effectively swapped, with the condition codes (in modified form) being provided as data inputs and the flag bits resulting from instruction execution being provided as select inputs. Since the condition codes do not depend on execution of the first operation, they may be provided in advance of the dispatch of the fused branch instruction to an execution unit in ALU 242. Furthermore, the arrangement allows for the various cases to be broken into multiple multiplexers instead of running all through a single multiplexer. As a result, the gate delay may be reduced from a minimum of seven gates down to four, allowing for faster execution of fused branch instructions.

It is noted that PCU 30 may not be utilized for instructions that are not predicated branch instructions. Accordingly, in some embodiments, PCU 30 may be disabled for the execution of such instructions. Although not explicitly shown, PCU 30 may include an enable input upon which a signal is asserted to enable its operation, and de-asserted to disable its operation. The signal input in such an embodiment may be asserted or de-asserted based on a bit stored in an status register entry that is associated with a given instruction. The bit may be set for each predicated branch instruction, thereby enabling PCU 30.

Figure 5:
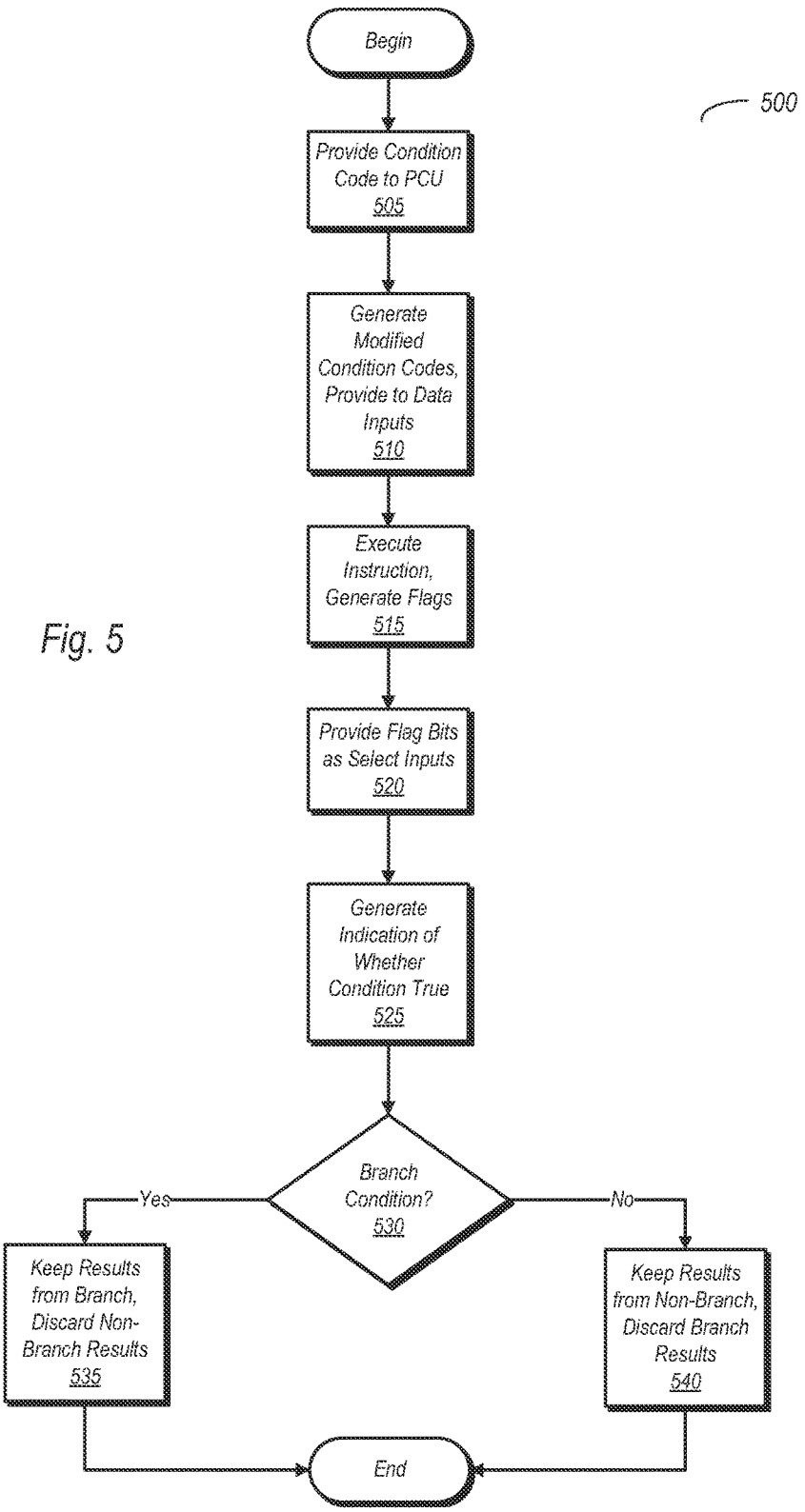
FIG. 5 is a flow diagram illustrating one embodiment of a method for performing a predicate calculation.

Turning now to FIG. 5, a flow diagram of one embodiment of a method for performing a predicate calculation is shown. Method 500 may be applied to various embodiments of a PCU, including PCU 30 as shown in FIG. 2 and discussed above.

Method 500 begins with providing a condition code to a PCU (block 505). This may occur prior to the dispatch of a corresponding predicated branch instruction to an execution unit. This may allow for the generation of modified condition codes (block 510) prior to beginning execution of a predicated branch instruction (or prior to completion of the first operation thereof).

With the modified condition codes generated and provided as data inputs to one or more multiplexers of the PCU, execution of the first operation of the predicated branch instruction may occur (block 515). Responsive to executing the first operation of the predicated branch instruction, flag bits may be generated and provided as select inputs to the multiplexers of the PCU (block 520). Based on the modified condition codes provided as data to the multiplexers and the state of the flag bits (which may also be provided to separate logic units for special cases), an indication may be generated indicating if the condition corresponding to the received (unmodified) condition code is true (block 525).

Figure 6:
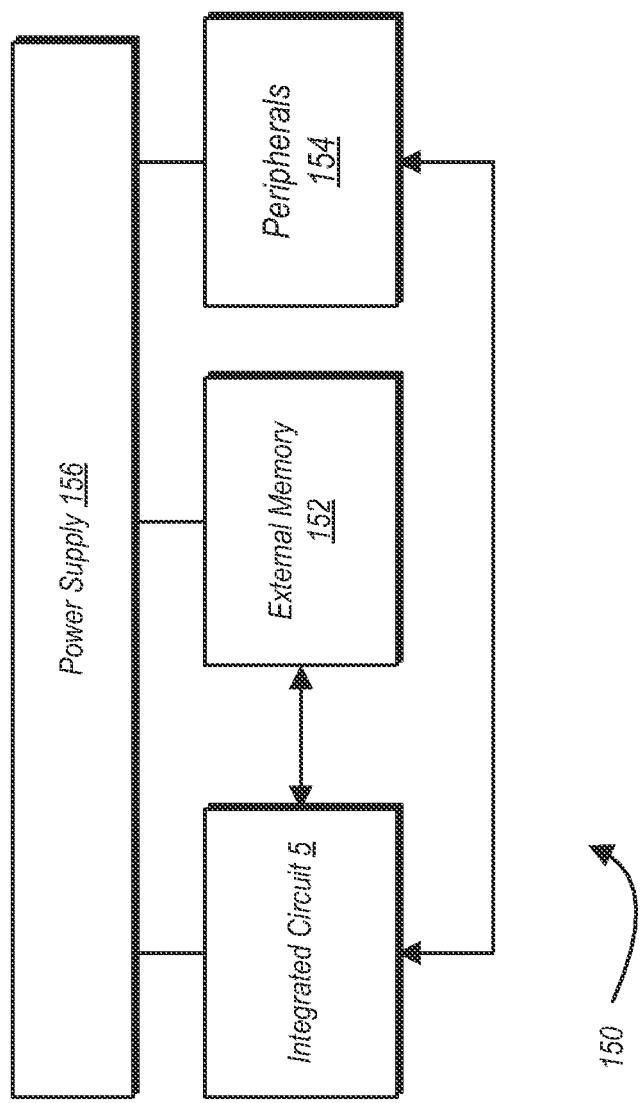
FIG. 6 is a block diagram of one embodiment of an exemplary system.

Prior to execution of the predicated branch instructions, instruction sequences associated with a branch taken and a branch not taken may both be speculatively executed. Results from both of these instruction sequences may be stored in physical registers. If the state of the condition as determined by the PCU corresponds to a branch condition (i.e., the branch is taken; block 530, yes), then the speculative results from the branch taken path may be retained, while speculative results from the branch not taken path may be discarded (block 535). Otherwise, if the condition corresponds to the branch not being taken (block 530, no), then the results from the branch taken path are discarded, while the results from the branch not taken path are retained (block 540). Regardless of whether the branch is taken, the retained results may eventually be committed to logical registers.
Exemplary System:

Turning next to FIG. 6, a block diagram of one embodiment of a system 150 is shown. In the illustrated embodiment, the system 150 includes at least one instance of an IC 5 (e.g., that implements processor 10 of FIG. 1) coupled to one or more peripherals 154 and an external memory 152. A power supply 156 is also provided which supplies the supply voltages to the IC 10 as well as one or more supply voltages to the memory 152 and/or the peripherals 154. In some embodiments, more than one instance of the IC 10 may be included (and more than one external memory 152 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 152 may include any type of memory. For example, the external memory 152 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   first and second multiplexers configured to receive, respectively, first and second pluralities of data bits each corresponding to a modified condition code of an instruction, wherein the first and second plurality of data bits are mutually exclusive and the condition code indicates one or more conditions to be checked responsive to execution of the instruction, wherein at least one of the first and second pluralities of data bits is all logic zeros;
   an execution unit configured to, responsive to execution of the instruction, provide a first plurality of flag bits as selection bits to the first multiplexer and a second plurality of flag bits as selection bits to the second multiplexer, the first and second pluralities of flag bits being mutually exclusive; and
   a first logic circuit configured to output an indication of whether a condition associated with the condition code is true based on outputs received from the first and second multiplexers.

2. The apparatus as recited in claim 1, further comprising a second logic circuit coupled to receive at least one of the first plurality of flag bits and at least one of the second plurality of flag bits.

3. The apparatus as recited in claim 2, wherein the first logic circuit is configured to output the indication of whether a condition associated with the condition code is true or false based on outputs from the second logic circuit, the first multiplexer, and the second multiplexer.

4. The apparatus as recited in claim 1, further comprising a branch unit coupled to receive the output of the first logic circuit, wherein the branch unit is configured to determine if a conditional branch is to be taken based on the output of the first logic circuit.

5. A method comprising:
receiving, from one or more status registers, one or more condition codes indicative of a condition to be checked responsive to execution of a predicated branch instruction;
modifying the received condition codes to generate a first and second pluralities of data bits, the first and second plurality of data bits being mutually exclusive, wherein modifying the received condition codes includes generating all logic zeros for at least one of the first and second plurality of data bits;
receiving, by first and second multiplexers, the first and second, the first and second plurality of data bits, respectively;
providing, from an execution unit, a first plurality of flag bits to select inputs of the first multiplexer responsive to execution of the instruction;
providing, from the execution unit, a second plurality of flag bits to select inputs of the second multiplexer responsive to execution of the instruction, the first and second pluralities of flag bits being mutually exclusive; and
generating an indication of whether a condition associated with the condition code is true based on outputs provided by the first and second multiplexers.

6. The method as recited in claim 5, wherein a first logic circuit is configured to generate the indication, and wherein the method further comprises:
a second logic circuit receiving at least one of the first plurality of flag bits and at least one of the second plurality of flag bits.

7. The method as recited in claim 6, further comprising generating the indication based on outputs provided by the first multiplexer, the second multiplexer, and the second logic circuit.

8. The method as recited in claim 5, further comprising a branch unit determining, based on the indication, if a conditional branch associated with the instruction is taken.

9. A processor comprising:
a status register configured to provide a condition code associated with an instruction, wherein the condition code is indicative of one or more conditions to be checked responsive to execution of the instruction;
an execution unit configured to generate a plurality of flag bits responsive to execution of the instruction; and
a predicate unit including:
a plurality of multiplexers each coupled to receive a respective unique plurality of data bits each corresponding to respective modified condition codes, wherein the modified condition codes are generated based on the condition code, wherein at least one of the modified condition codes is, based on the condition code, received at inputs of least one of the plurality of multiplexers as all logic zeros, and wherein each of the plurality of multiplexers is further configured to receive one or more of the flag bits as select inputs, wherein flag bits received by each of the plurality of multiplexers is mutually exclusive to flag bits received by other ones of the plurality of multiplexers; and
an output unit configured to, based on respective outputs from each of the plurality of multiplexers, set an output bit if a condition indicated by the condition code is true.

10. The processor as recited in claim 9, wherein the data bits provided to a first one of the plurality of multiplexers is a first modified version of the condition code, and wherein the data bits provided to a second one of the plurality of multiplexers is a second modified version of the condition code.

11. The processor as recited in claim 10, wherein the first one of the plurality of multiplexers is coupled to receive, as select inputs, a first set of flag bits, and wherein the second one of the multiplexers is coupled to receive, as select inputs, a second set of flag bits mutually exclusive of flag bits of the first set.

12. The processor as recited in claim 11, further comprising a logic circuit coupled to receive at least one of the first set of flag bits and at least one of the second flag bits, wherein the output unit is configured to, based on respective outputs from each of the plurality of multiplexers and the logic circuit, set the output bit if the condition indicated by the condition code is true.

13. The processor as recited in claim 11, further comprising a modification unit configured to convert the condition code into a first plurality of data bits to be received by the first one of the plurality of multiplexers and further configured to convert the condition code into a second plurality of data bits to be received by the second one of the plurality of multiplexers.

14. A method comprising:
generating, based on a condition code provided from a status register, first and second modified condition codes;
providing the first modified condition code to data inputs of a first multiplexer and the second modified condition code to data inputs of a second multiplexer, wherein the first and second modified condition codes are mutually exclusive, and wherein at least one of the first and second modified condition codes is provided to the data inputs of its respective multiplexer as all logic zeros, depending on the condition code received from the status register;
generating a plurality of flag bits responsive to executing, in an execution unit, an instruction associated with the condition code;
providing a first set of the plurality of flag bits as select inputs to the first multiplexer and a second set of the plurality of flag bits as select inputs to the second multiplexer; and
determining, based on outputs of the first multiplexer, the second multiplexer, and a logic unit, whether a condition indicated by the condition code is true.

15. The method as recited in claim 14, further comprising:
a conversion unit receiving the condition code;
the conversion unit providing the first modified condition code to the first multiplexer; and
the conversion unit providing the second modified condition code to the second multiplexer.

16. The method as recited in claim 14, further comprising:
the logic unit receiving at least one of the first set of the plurality of flag bits;
the logic unit receiving at least one of the second set of the plurality of flag bits; and the logic unit providing an indication whether a particular one of a plurality of conditions is true based on the at least one of the first set and at least one of the second set.

17. The method as recited in claim 14, wherein the condition code includes a plurality of bits, and wherein the condition code indicates one of a plurality of conditions depending on respective states of the plurality of bits.

18. The method as recited in claim 14, further comprising:
providing, to a branch unit, an indication whether the condition indicated by the condition code is true; and
determining whether a branch in an instruction flow is taken based on the indication.

19. An integrated circuit comprising:
a first multiplexer having a respective plurality of data inputs coupled to receive a first modified condition code and a respective plurality of select inputs coupled to receive a first set of a plurality of flag bits from an execution unit, the first set including a first flag bit provided directly to a first select input of the first multiplexer and a second flag bit provided to a directly second select input of the first multiplexer;
a second multiplexer having a respective plurality of data inputs coupled to receive a second modified condition code and a respective plurality of select inputs coupled to receive a second set of the plurality of flag bits from the execution unit, wherein the first and second modified condition codes are mutually exclusive, wherein the first and second sets of the plurality of flag bits are mutually exclusive, and wherein the second set includes a third flag bit provided directly to a first select input of the second multiplexer and a fourth flag bit provided directly to a second select input of the second multiplexer, wherein at least one of the modified condition codes is, based on and unmodified condition code, received at inputs of least one of the first and second multiplexers as all logic zeros;
a logic unit configured to receive selected ones of the plurality of flag bits, including at least one flag bit from the first set and at least one flag bit from the second set; and
an output unit configured to provide an indication whether a particular condition indicated by the unmodified condition code is true based on outputs from the first multiplexer, the second multiplexer, and the logic unit.

20. The integrated circuit as recited in claim 19, further comprising a modification circuit coupled to receive an unmodified condition code, wherein the modification circuit is configured to generate the first and second modified condition codes based on the unmodified condition code.

21. The integrated circuit as recited in claim 20, further comprising a status register coupled to provide the unmodified condition code to the modification circuit.

22. The integrated circuit as recited in claim 20, further comprising an execution unit configured to execute an instruction associated with the unmodified condition code, and further configured to generate the plurality of flag bits responsive to execution of the instruction.

23. The integrated circuit as recited in claim 19, further comprising a branch circuit coupled to receive the indication from the output unit, wherein the branch circuit is configured to determine if a branch is to be taken in a sequence of instructions responsive to receiving the indication.

* * * * *